Jan. 23, 1934.  L. T. RICHARDSON  1,944,464
ART OF TREATING PLASTIC MOLDING COMPOSITIONS INCLUDING
A FIBROUS FILLER AND AN ORGANIC BINDER
Filed March 28, 1928  2 Sheets-Sheet 1

INVENTOR.
Linwood T. Richardson
BY
ATTORNEY.

Jan. 23, 1934. L. T. RICHARDSON 1,944,464
ART OF TREATING PLASTIC MOLDING COMPOSITIONS INCLUDING
A FIBROUS FILLER AND AN ORGANIC BINDER
Filed March 28, 1928 2 Sheets-Sheet 2

INVENTOR.
Linwood T. Richardson
BY
ATTORNEY.

Patented Jan. 23, 1934

1,944,464

UNITED STATES PATENT OFFICE 1,944,464

ART OF TREATING PLASTIC MOLDING COMPOSITIONS INCLUDING A FIBROUS FILLER AND AN ORGANIC BINDER

Linwood T. Richardson, Milwaukee, Wis., assignor, by mesne assignments, to Cutler-Hammer Inc., a corporation of Delaware Application March 28, 1928. Serial No. 265,397

9 Claims. (Cl. 18—55)

This invention relates to improvements in the art of treating plastic molding compositions including a fibrous filler and an organic binder. The invention more particularly relates to methods of and means for improving the smoothness, brilliance or surface finish, strength, and other characteristics of articles molder from plastic compositions of the type aforementioned.

Heretofore in this art the plastic composition material when prepared for molding has usually been in the form of small pellets or granules,—such form of the material necessitating accurate weighing (either manually or otherwise) of each individual charge for the molding press. Moreover, articles molded from such granular material have ordinarily lacked the brilliant surface finish or the high degree of strength, or both, required or desired for commercial purposes.

As will hereinafter more fully appear the methods herein contemplated comprise essentially the steps of thoroughly mixing, extruding, blanking and molding plastic composition material comprising an organic binder and a fibrous filler. Moreover, said steps are so co-ordinated or correlated as to provide a continuous process including preparation of the fibrous plastic composition material, the initial forming operation, and the final molding. By employing the step of continuously mixing or kneading under pressure and extruding the plastic composition material I find that a substantially complete or perfect mixture of the ingredients is effected, thus insuring homogeneity or uniform composition of the material.

Similarly, the extruding operation, in conjunction with the aforementioned mixing operation, is found to have the following additional beneficial effects; namely, it causes such an arrangement of the fibers of the filler as to insure a high degree of strength of the extruded material; it further causes segregation of a thin film of substantially fiber-free binder material on the surface of the formed piece whereby a higher finished surface is insured. The last mentioned desirable result is accentuated when means for heating the extrusion die are provided. As will be pointed out in detail hereinafter, the rod or strip of extruded material is inherently provided with smooth surfaces consisting of the aforementioned film of higher binder content.

An object of my invention is to provide simple and efficient methods of and means for obtaining the aforementioned desirable results.

Another object is to facilitate the production of molded articles comprising a fibrous filler and an organic binder, by reducing the amount of manual labor or attention required in the preparation of the material for molding.

Another object is to facilitate lubrication of the dies employed in molding the plastic composition material.

Another object is to insure proper initial distribution of the plastic composition material within the molding die, whereby wastage of the molding material and the necessity for inspection of the molded pieces are practically eliminated.

Another object is to insure a substantially perfect mixture, with resultant homogeneity, of the fibrous filler and binder in the body of the molded piece while at the same time providing a very thin surface film of higher binder content.

Another object is to greatly improve the surface finish and strength of molded and heat treated insulation articles of the character aforementioned.

Another object is to provide an article of manufacture comprising a molded and heat treated piece having the aforementioned desirable characteristics.

Other objects and advantages of the invention will hereinafter appear.

In the drawings, Figure 1 illustrates schematically an apparatus for carrying out my improved process; and Fig. 1a illustrates a slight modification of apparatus shown in Fig. 1.

As aforeindicated, I contemplate treatment of fibrous plastic molding compositions to facilitate the production of molded articles therefrom and to improve the surface finish or polish of such articles, as well as to greatly increase the cross breaking strength or impact resistance of the latter.

I will here mention, by way of example, one type of plastic composition material which is particularly adapted for cold molding with subsequent prolonged heat treatment for curing; but it is to be understood that my invention is likewise applicable to the treatment of various other cold molding plastic composition materials, as well as to plastic composition materials adapted for hot molding or quick hot molding. Thus I may employ a binder produced from ingredients in substantially the following proportions by weight:

| | |
|---|---:|
| Stearine pitch | 1050 |
| Coal tar pitch | 945 |
| Gilsonite | 105 |
| Fish oil (or castor oil) | 168 |

The stearine pitch, coal tar pitch and gilsonite are placed in a suitable vessel and heated to about 500 degrees F. with stirring, to form a homogeneuos mass. The mixture is allowed to cool slightly and the fish oil is stirred in,—about twenty per cent of the weight of coil tar pitch being precipitated as free carbon. Thereafter the supernatant liquid is drawn off, and to 130 parts thereof about 32 parts of benzol may be added. I preferably employ an asbestos filler, a large percentage of the fibers of which may be relatively long. A suitable mix may consist of:

| | |
|---|---:|
| Binder | 39 pounds |
| Asbestos | 150 pounds |
| Sulphur | 9 pounds |
| Iron oxide | 3 pounds |
| Solvent (benzol) | 2 to 4 quarts |

Said mixture, or any other well known or desired mixture comprising a fibrous filler and organic binder material, may be treated in the usual manner to reduce the same to the form of small granules or pellets. Thereafter, instead of weighing portions of the granular material to form individual charges for the molding die, I interpose the following steps of treatment.

Figure 1:
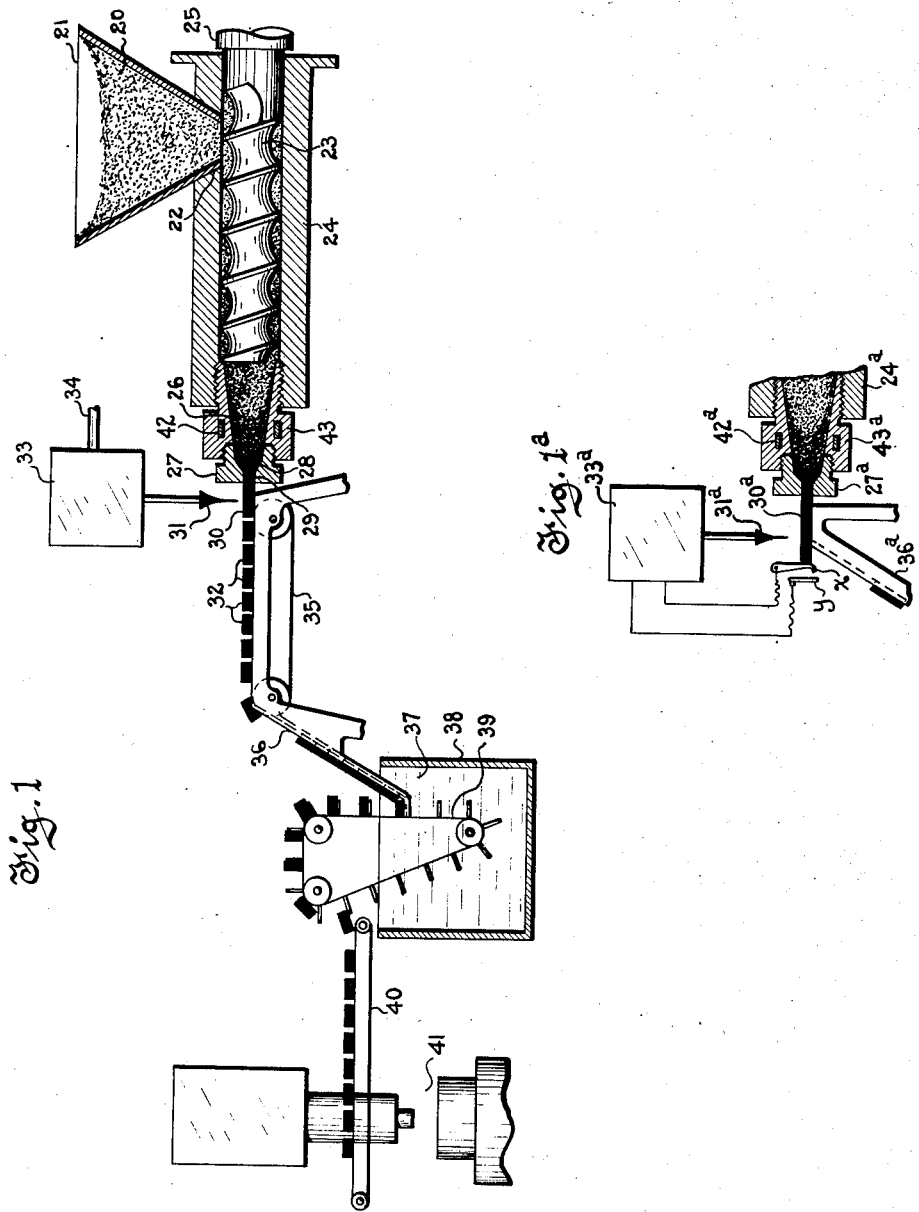

Thus, as shown in Fig. 1 the granular mixture 20 is placed in a suitable hopper 21 through the lower end 22 of which the mixture discharges into a spiral or screw 23. Screw 23 is rotatably mounted in a suitable casing or housing 24, and the end 25 of the screw shaft is connected with suitable continuously operable driving means whereby the plastic composition is further kneaded or worked under relatively high pressure to transform the granular material into an integral and homogeneous plastic mass which is gradually and continuously carried toward the discharge end of casing 24.

Either integral with or detachable from the discharge end of casing 24 is a portion having a gradually constricted passage 26, and a nozzle 27 is threaded into or otherwise secured to said portion to form a continuation 28 of said constricted passage 26. Nozzle 27 is further provided with a discharge orifice 29 of any suitable shape and size, through which the plastic mixture may be forced or extruded in the form of a continuous rod, bar or strip 30 of compacted material.

Also if desired the nozzle 27 may be provided with means for causing the material as extruded to take the form of a continuous tube or hollow cylinder.

As will be apparent, the rate of discharge or extrusion of the thoroughly mixed and compacted material through orifice 29 will depend upon the rate of operation of the screw 23; and for any given plastic mixture the density or mass per unit length of the extruded strip will remain substantially constant. Therefore by providing a cutter 31 or the like which is operable intermittently at a rate corresponding with the rate of operation of the screw 23, I may divide the continuous strip 30 into blanks or slugs 32 of like dimensions, and consequently of equal predetermined weight or mass.

As shown the operating gearing 33 for knife or cutter 31 may be connected through shaft 34 with the source of power which also drives screw 23. By the means aforedescribed I am enabled to provide blanks consisting of the exact predetermined amount of material required for the production of a particular molded piece,—and in this way the necessity for weighing the mold charge is obviated, and wastage of the plastic composition material is prevented.

Other means for controlling the rate of intermittent operation of the blanking cutter may be provided. Thus if desired the actuating means for said cutter may be rendered responsive to or dependent upon extrusion of a predetermined length of the material prior to each severing operation of the cutter.

Such an arrangement is illustrated diagrammatically in the fragmentary view of Fig. 1a,—parts in said figure corresponding with parts illustrated in Fig. 1 being designated by like reference numerals with the exponent $a$ added. Thus the operating gearing $33^a$ for cutter $31^a$ may comprise electrical means responsive to closure of contacts $x$ and $y$ for effecting downward movement of the cutter blade,—said contacts $x$ and $y$ being automatically closed by the extruded rod or bar when the latter attains a predetermined length, as will be obvious;—the blank when severed being adapted to fall out of engagement with contact $x$ to permit normal open positioning of the latter.

Figure 2:
Figs. 2 and 3 are end and perspective views, respectively, of one form of blank produced in accordance with my invention.
Figure 3:
Figure 4:
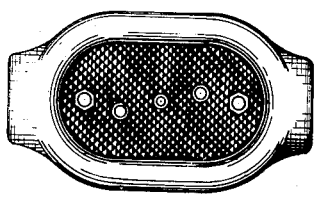
Figs. 4, 5 and 6 are top, end and side views, respectively, of an article molded from a blank of the type illustrated in Figs. 2 and 3.
Figure 5:
Figure 6:

The blanks formed by the means illustrated in Fig. 1 may be of the shape illustrated in Figs. 2 and 3, wherein the two short sides of the blank are parallel to each other and the two longer sides are in plano-concave relationship to each other. Each blank will consist of the exact amount of material required to mold the piece shown in Figs. 4, 5 and 6.

However, prior to feeding the blanks to the mold or die I prefer to coat the same with a suitable lubricant, to obviate any possibility of the formed piece sticking in the die. By way of example I have shown an endless conveyer 35 which discharges the blanks 32 into a chute 36 whose lower end is beneath the surface of a body 37 of liquid lubricant (such as a solution of stearic acid, or a solution of glycerin and water, or the like) within a suitable container or receptacle 38. From such chute the immersed blanks may be carried by a suitable endless conveyer 39, and discharged onto another endless conveyer 40.

As shown the conveyer 40 is merely adapted to carry the lubricant-coated blanks to a position convenient to the molding press operator for manual feeding thereof to the molding die; but if desired suitable means may be provided for automatically feeding the blanks to the die. A conventional form of power operated press or mold is illustrated at 41.

The rates of operation of the various elements of the apparatus illustrated will preferably be so co-ordinated or synchronized as to provide for delivery of blanks at a rate corresponding to the capacity of the press or die; or if desired under certain circumstances the other elements of the apparatus may be operated while the molding press or die remains idle, the coated blanks being then discharged by conveyer 40 into a suitable receptacle (not shown) for storage or the like. Similarly, it will be apparent that a single conveyer may be utilized to supply blanks to a plurality of molding presses or dies.

As will be understood by those skilled in the art, it is desirable that the major dimensions of the blank shall approximate the corresponding dimensions of the piece to be molded therefrom. Thus the nozzle 27 (Fig. 1) may be removed, and a nozzle having an orifice of any other desired shape may be substituted therefor, whereby the cross sectional shape and contour of the extruded rod or strip may be predetermined; and the rate of intermittent operation of cutter 31 may be varied to provide a blank of the desired length.

Figure 7:
Fig. 7 illustrates another form of blank.
Figure 8:
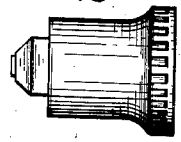
Fig. 8 shows an article molded from such blank.

For instance, Fig. 7 illustrates a blank cut to the desired length from a continuous rod extruded through a nozzle having a circular orifice, and Fig. 8 shows the insulating portion of an attachment plug as molded from such a blank.

Figure 11:
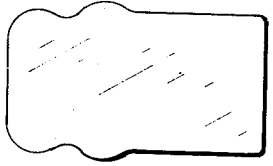
Fig. 11 shows such blank when cut or trimmed to the form shown in dotted lines in Fig. 9, and Figs. 12 and 13 are top and side views of an article molded from the blank shown in Fig. 11.
Figure 9:
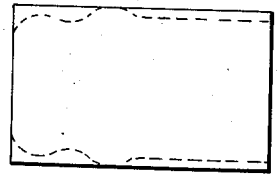
Figs. 9 and 10 are top and end views of still another form of blank.
Figure 10:
Figure 12:
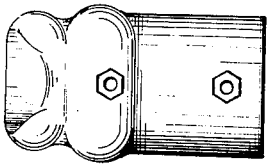
Figure 13:

Figs. 9 and 10 illustrate a blank initially cut from a continuous strip comprising fibrous filler and binder materials which have been thoroughly mixed in the manner aforedescribed and then extruded through a nozzle having an orifice of the shape illustrated in Fig. 10. In order to produce the best results in molding shapes of the irregular type illustrated in Figs. 12 and 13 it is preferable to cut or stamp the initial blank of Fig. 9 in the manner indicated in dotted lines to provide a final blank of the contour illustrated in Fig. 11. Said final blank likewise includes the exact amount of material required to form the article shown in Figs. 12 and 13 by the molding operation.

It will be understood, however, that in certain instances, depending upon the particular type of plastic composition material employed and the shape of the molding die, it may be permissible or even preferable to employ an initial blank such as shown in full lines, Fig. 9,—thus avoiding the additional blanking operation. In each instance, however, the size of the blank will be so regulated or predetermined as to provide substantially the exact amount of material required in the final molded piece.

In certain cases, and particularly for certain types of plastic composition material, it is desirable to provide for heating the wall of the constricted passage 26, and I have shown an electric heater 43 embedded in the aforementioned constricted end portion of the extruder casing. Also it will be understood that any other suitable or well known heating means may be employed.

I have found that very good results may be obtained by mixing and extruding the material in the manner aforedescribed and then blanking the same to provide shapes substantially of the size and contour desired in the pieces resulting from the final molding operation. In this way I may obviate any substantial flow of the blanked material during the final molding operation, and the beneficial results of the treatment of the material prior to the blanking operation are fully preserved; whereas certain of such results, including brilliance and smooth surface finish, may be augmented by the final molding operation.

Also in certain instances it may be found desirable to feed the extruded material in the form of a continuous strip or rod directly to the molding die. In such case the strip would preferably have a direction of movement across the mouth of the mold cavity at a right angle to the direction of movement of the movable element of the press or die,—thus providing for utilization of the latter to simultaneously blank and mold the extruded material.

Assuming production of articles of the various final shapes illustrated by a cold molding operation, such articles will be subjected to the usual prolonged heat treatment for curing. The manner of effecting such heat treatment is well understood in the art and is modified to suit the characteristics of the particular plastic composition material employed and the shapes of the molded pieces. Hence further discussion thereof herein is deemed unnecessary.

As aforeindicated, the advantages of my invention reside essentially in improvement of the finish or polish of molded articles of the character herein contemplated, and in the greatly increased cross breaking strength or impact resistance of the molded and heat treated articles.

Similarly the molding die may be lubricated in an improved and simplified manner, namely by providing a lubricating coating upon the blanks or slugs of extruded plastic composition material. Also by mixing, extruding and blanking the plastic composition material in the manner herein contemplated the quantity and distribution of such material within the die is more accurately predetermined, and the necessity for weighing the charge for the die is obviated.

The reason for the improvement in the smoothness and finish or natural polish of the molded articles produced in accordance with my invention cannot be stated with certainty, but such improvement is probably due to the fact that it is easier to produce a more perfectly smooth and polished surface by pressing a smooth or flat surface (of the die) against a previously smoothed surface (of the blank) than it is to form a smooth and polished surface from a multiplicity of pellets or granules, as attempted heretofore.

Also as aforementioned it is found that the step of extruding a plastic molding composition of the character herein contemplated has the peculiar and beneficial effect of producing a smooth surface film of higher binder content upon the extruded piece,—which surface film is retained and perhaps slightly augmented by the final molding operation. The blank of molding material is thus enabled to take more perfectly the impression of the molding die, and the resulting smoothness or finish and brilliance of the molded piece approximates that which might be attained if the filler material were omitted.

I have found by experiment that molded and heat treated articles produced in accordance with my invention, including the steps of mixing or kneating under pressure and extruding the plastic composition material, have a greatly increased degree of impact resistance which may be four or five times as great as molded articles similarly produced, but with my additional steps of mixing under pressure and extrusion omitted. Even greater increase of impact resistance may occur at times as a result of my process.

This unexpectedly great increase in strength may be in part due to the fact that the aforedescribed mixing under pressure and extrusion treatment inherently effects welding of the individual particles of the plastic composition and results in a high degree of homogeneity of the material forming the extruded piece, thus avoiding the production and maintainance of air pockets in the material during the molding operation while insuring adequate flow of both the surface and body of the material of which the blank is composed. Similarly the mixing and extruding operation effects a most efficient interlaced arrangement or distribution of the fibers of the filler while accentuating the contact of the latter with and impregnation of the latter by the binder substance.

The simplicity and effectiveness of the manner of lubricating the molding die by continuously coating the individual blanks with lubricant will be apparent to those skilled in the art.

Many slight modifications in the details of the methods and apparatus herein disclosed will be at once apparent to those versed in the art of treating plastic molding compositions.

Thus, by the simple expedient of adding suitable pigments of different colors just prior to feeding the composition to the extruder, various striped or striated color effects will be produced in the extruded material of which the blanks are formed, and said effects will be maintained or slightly modified by the final molding operation,—depending of course upon the amount of flow necessitated by the change from blanked to molded form.

Due to the relatively great density of the extruded and blanked material, it is found that the blanks may be stored for considerable periods of time prior to the final molding operation without affecting the plasticity or other desired characteristics of the material of which the blanks are composed. Moreover, by coating each blank with a lubricant, as aforedescribed, a hermetic seal for the material comprising the blank is provided, and the relative inertness of the blanked material with respect to atmospheric conditions is accentuated.

While I have found that a combined mixing or kneading and extruding machine of the type herein disclosed is particularly well adapted for accomplishment of my improved results, it is to be understood that slight modifications in the preferred methods and apparatus may be made without departing from the spirit and scope of my invention as defined by the appended claims. For instance, by employing a mixing screw and cylinder of sufficiently greater length than that disclosed, a comparable degree of mixing of the fibrous filler and organic binder materials may be effected without requiring the use of a restricted orifice for purposes of extrusion. Pieces molded from material mixed in the manner just described are found to have the aforementioned characteristic of great cross breaking strength, and the smoothness and natural surface finish of such pieces is much better than that of pieces molded from material in granular or pellet form. Obviously, however, the extrusion and blanking operations are so simple and lend themselves so admirably toward continuous and automatic treatment of the molding material that the same will preferably be included in the practice of my improved process.

As a further example of plastic molding compositions of the type aforementioned which are particularly adapted for treatment in accordance with my invention; I may provide a molding mixture comprising ingredients in about the following proportions:

| | Parts by weight |
|---|---|
| Phenol condensation hot molding resin | 13.5 |
| Cresol | 11.0 |
| Hexamethylenetetramine | 2.4 |
| Alcohol | 1.0 |
| Asbestos | 100.0 |

The phenol condensation resin may be of any well known type; and as will be understood by those skilled in the art the relative proportions of the phenol condensation resin and the cresol and hexa may be varied as desired to obtain mixtures of different degrees of plasticity. The ingredients of the aforementioned binder are brought into solution by thorough mixing, with or without heating; whereupon the binder is mixed with the asbestos, and the aggregate then treated in accordance with my invention as described herein, to obtain the improved results aforementioned.

What I claim as new and desire to secure by Letters Patent is:

1. The process of treating cold-moldable plastic composition material to provide articles adapted for the electric insulating art, which comprises intimately mixing a fibrous filler and an organic binder in predetermined proportions, extruding the mixture to form a continuous strip of material of predetermined mass or density per unit length, then dividing said strip transversely into blanks of predetermined length, and then cold-molding the blanks under heavy die pressure to provide articles of the desired shape and dimensions.

2. The process of treating cold-moldable plastic composition material to provide articles adapted for the electric insulating art, which comprises intimately mixing a fibrous filler and an organic binder, extruding the mixture through an orifice of predetermined dimensions to form a strip of compacted material, dividing said strip into blanks of predetermined length, coating said blanks with a lubricant to facilitate molding thereof, and then cold-molding said blanks under heavy die pressure into articles of the desired shape.

3. The process of treating cold-moldable plastic composition material to provide articles adapted for the eletric insulating art which comprises intimately mixing a fibrous filler and an organic binder, extruding the mixture through a heated orifice of predetermined dimensions to form a strip of compacted material, dividing said strip into blanks of predetermined length, coating said blanks with a lubricant to facilitate molding thereof, and then cold-molding said blanks under heavy die pressure into articles of the desired shape.

4. The process of treating cold-moldable plastic composition material to provide articles adapted for the electric insulating art, which comprises intimately mixing or kneading under pressure a fibrous filler and an organic binder, extruding the mixture through an orifice of predetermined shape and size to form a strip of compacted material, dividing said strip into blanks of predetermined length, coating said blanks with lubricant to facilitate molding thereof, cold-molding said blanks under heavy die pressure into articles of the desired shape, and then subjecting the molded articles to the usual prolonged heat treatment for curing.

5. The method of treating cold-moldable plastic composition material to increase the cross breaking strength and to improve the surface finish of electric insulating articles molded therefrom, which comprises intimately mixing or kneading under pressure a fibrous filler and an organic binder, extruding the mixture through a constricted orifice to more intimately weld or unite the indivdual particles thereof and to provide a strip of material having a smooth and polished exterior, blanking said strip, and then cold-molding the blanks individually under heavy die pressure into articles of the desired shape.

6. The method of increasing the impact resistance and improving the surface finish of electric insulation articles formed of a cold-moldable and heat-induratable plastic composition of fibrous filler and organic binder materials, which comprises, as an intermediate distinct step, extrusion of said plastic composition.

7. A cold molded and heat-indurated electric insulating article formed from an extruded blank consisting of a mixture of fibrous filler and organic binder materials, said article having a smooth and polished surface induced by extrusion of said mixture.

8. A cold-molded and heat-indurated electric insulating article consisting of an extruded mixture of fibrous filler and organic binder materials, said article having a more brilliant natural surface finish and greater cross breaking strength than an article of similar composition molded from a granular mass.

9. A cold-molded and heat-indurated electric insulating article of high surface finish, said article consisting of an extruded mixture of fibrous filler and organic binder materials and having a surface layer of higher binder content than the interior thereof, said surface layer being derived from the original binder content of the mixture.

LINWOOD T. RICHARDSON.